United States Patent
Galyon

[19]

[11] Patent Number: 6,050,799
[45] Date of Patent: Apr. 18, 2000

[54] AUTO GLASS REPAIR SYSTEM

[76] Inventor: Glenn Charles Galyon, 2612 State Park Rd., Greenville, S.C. 29609

[21] Appl. No.: 08/938,345

[22] Filed: Sep. 26, 1997

[51] Int. Cl.[7] .............................. B29C 33/26; B29C 33/30
[52] U.S. Cl. ............................ 425/12; 425/13; 264/36.21
[58] Field of Search .............................. 264/36.16, 36.18, 264/36.21, 36.22, 267; 156/94, 98, 256, 293, 513; 425/11, 12, 13, 14, 127, 128, 129.1; 65/28, 171

[56] References Cited

U.S. PATENT DOCUMENTS

| | | | |
|---|---|---|---|
| 4,208,229 | 6/1980 | Giardini ...................................... | 156/94 |
| 4,597,727 | 7/1986 | Birkhauser, III .......................... | 425/12 |
| 4,775,305 | 10/1988 | Alexander et al. ........................ | 425/12 |
| 4,826,413 | 5/1989 | Matles ........................................ | 425/12 |
| 5,057,265 | 10/1991 | Kunert et al. ............................. | 264/161 |
| 5,063,006 | 11/1991 | Tahara ................................... | 264/36.22 |
| 5,104,304 | 4/1992 | Dotson ....................................... | 425/13 |
| 5,303,132 | 4/1994 | Lowder .................................... | 362/138 |
| 5,328,649 | 7/1994 | Newsome ................................... | 425/13 |
| 5,486,321 | 1/1996 | Spatenka ................................... | 425/12 |
| 5,776,506 | 7/1998 | Thomas et al. ............................ | 425/13 |

OTHER PUBLICATIONS

Brochure—Glass Magic Windshield Repair System, Pittsburgh Plate Glass Distributer.
Kleer–Vu Windshield Repair Kit, Equalizer 1996 Catalog (p. 37).
Clear Star Windshield Repair Kit, Equalizer 1996 Catalog (p. 38).
AEGIS Windshield Repair System, Sommer & Maca (p. 81).

*Primary Examiner*—Angela Ortiz
*Attorney, Agent, or Firm*—Robert R. Reed; Cort Flint

[57] ABSTRACT

The present invention is used for making repairs to a laminated glass having a layer with a damaged area. A drill and bit are used to make a drilled hole at the damaged area of the glass. A large vacuum cup which is standard for handling large sections of glass is attached to the glass and the pump and handle of the cup is used to support a bridge with a swivel nut in position to receive an injector. The injector is connected to a hand pump which is first operated to clear the window of debris by providing a high vacuum pressure. The hand pump is also used to evacuate air from the injector before a repair resin is injected into the drilled hole at the damaged area. The hand pump has a mode valve to produce a pressurizing cycle to provide an injection pressure of 30 to 35 psi. The high injection pressure forces the resin into the drilled hole to penetrate the damaged area and repair the glass. Curing of the resin is achieved by exposing the resin to Ultra-Violet light by using a U-V patch and/or a U-V curing lamp.

8 Claims, 4 Drawing Sheets

AUTO GLASS REPAIR SYSTEM

BACKGROUND OF THE INVENTION

This invention relates to the repair of laminated glass windows of vehicles and buildings, and more particularly to small areas damaged by objects striking a window or glass and fracturing a glass layer.

One of the most costly time consuming tasks involving the repair of vehicles is the task of replacing a damaged windshield or other laminated glass surfaces in a vehicle. Most States have laws against operating a vehicle with a broken windshield. Insurance companies are also looking for ways to save the cost of insured glass repair work and may require a good repair in lieu of replacing the glass. Laminated glass is also used in buildings near entry and exit doorways for safety reasons. Building glass is also subjected to damage and can also be repaired by the same procedures used for vehicles. In general, a portable system for making high quality laminated glass repairs in lieu of replacing the glass is the subject of this invention.

A number of glass repair systems are available on the market. Two such systems are offered in the 1996 Equalizer Catalog. The "Kleer-VU Windshield Repair Kit" is illustrated on page 37 of this catalog and includes a system of components used in injecting a repair resin to repair external damage to a glass. A small bridge assembly and a vacuum pump are the principal components of this system. The "Clear Star Windshield Repair Kit" is illustrated on page 38 of the 1996 Equalizer Catalog and includes a pedestal used with a syringe type injector to repair externally damaged windshields. Both of these systems are limited by the amount of pressure they can support in forcing the resin into a damaged area of a glass.

A "Glass Magic Windshield Repair System" is distributed by Pittsburgh Plate Glass through local dealers. This system uses a triangular plate with a small suction cup to support the fitting where resin is injected. The inability to achieve a high injection pressure at the location of the damage area limits this system to smaller repairs.

The windshield repair system entitled "AEGIS" is advertised in the "SOMMER & MACA Catalog" on page 81. This system uses relatively small suction cups which are built to be integral and fixed with respect to the repair fixture, which limits the ability of the system to be adjusted.

Accordingly, an object of the present invention is to provide a glass repair system which is stable and able to apply relatively high pressure to force a resin into the damaged area of a window or other laminated glass.

Another object of the present invention is to provide a glass repair system which is totally adjustable to conform to the location and orientation of a window glass area being repaired.

Yet another object of the present invention is to provide a method to include the steps necessary for the proper use of various components of the glass repair system of this invention, including the use of a vacuum pressure to evacuate the damage area and verify the integrity of the damaged area.

SUMMARY OF THE INVENTION

The above objectives are accomplished according to the present invention by providing a method for repairing a laminated glass having a layer area which has been damaged. The method comprises a series of steps as follows:

a) drilling through the layer area of the glass using a conventional drill and bit to form a hole coexisting with a damaged area in the glass layer;

b) assembling together a vacuum cup having a vacuum cup pump, a bridge having adjustable portions with adjusting knobs and a swivel nut to form a repair assembly;

c) securing the repair assembly to the glass near the hole;

d) aligning the repair assembly using the knobs so that the swivel nut is located over the hole to be repaired;

e) inserting an o-ring into a barrel of an injector and installing the injector into the swivel nut until the o-ring is sealed against the glass;

f) attaching a hose connected to a hand pump to the injector, the hand pump having a mode valve set so that a vacuum is established by operating the hand pump for checking the seal and the integrity of the drilled hole of the damaged area for accepting the repair;

g) removing the hose from the injector and placing a resin within the injector;

h) reattaching the hose to the injector and placing an ultra-violet (U-V) cover over the injector for delaying the curing of the resin;

i) operating the hand pump for reestablishing a vacuum for a vacuum cycle time period to evacuate air from the drilled hole of the damaged area;

j) switching the mode valve and operating the hand pump to allow the resin to be pressurized and forced into the hole of the damaged area;

k) attaining an injection pressure within the injector and maintaining the pressure for an pressure cycle time period to inject the resin into the hole before removing the pressure;

l) removing the U-V cover from the injector to initiate curing of the resin and, after an initial time delay, remove the repair assembly from the glass;

m) curing the resin during a second time period by covering the resin with an U-V patch to allow the resin to become hard; and n) remove excess hardened resin to complete the process steps in repairing the laminated glass.

The above objectives are also accomplished according to the present invention by providing a system of components used in combination during the process of repairing a laminated glass having a layer area which has been damaged. The system comprises a drill and drill bit for drilling through the layer area to form a drilled hole in a location coexisting with the glass layer area to generally remove the damaged glass. A repair assembly including a bridge, a vacuum cup and a swivel nut is provided for attachment to the glass near the drilled hole. The vacuum cup has a pump and handle combination for securing the repair assembly to a surface of the glass, so that the bridge is adjustable with respect to the vacuum cup and glass. The system further comprises an injector with an injector barrel for receiving an o-ring. The injector is installed within the swivel nut so that the o-ring contacts the surface of the glass to encircle the drilled hole. A hose has one end connected to the injector and the other end connected to a hand pump. The hand pump has a mode valve so that the hand pump can be operated in a vacuuming mode, as well as a pressurizing mode. The hose is removable from the injector so that a resin can be inserted in the injector barrel for injecting the resin into the drilled hole when the hand pump is placed in the pressurizing mode by the mode valve and operated. An ultra-violet cover is placed over the injector for delaying the curing of the resin so that the resin can be forced into the drilled hole before it cures. A hand pump gauge of the hand pump is included for helping to attain an injection pressure to force the resin into the drilled hole. The system also comprises an ultra-violet patch to place over the resin after the resin is injected in the drilled hole for helping to cure the resin. Conventional tools and solvents are used for removing excess resin to essentially complete the repair of the glass.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
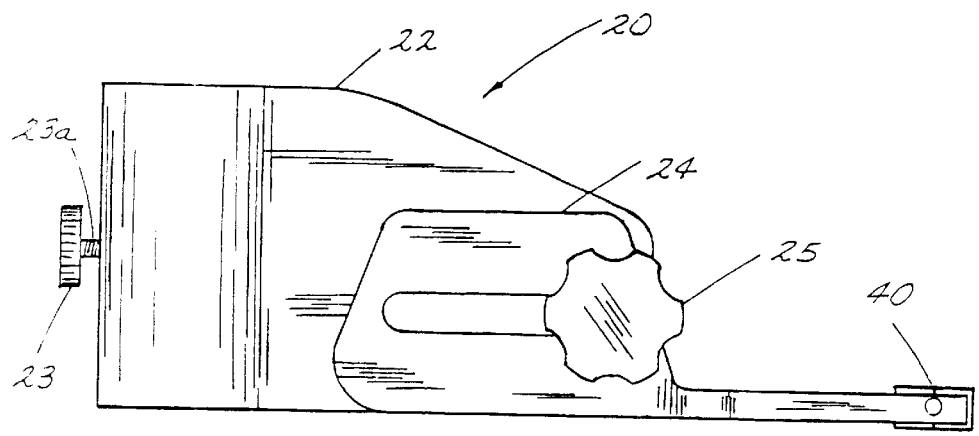
FIG. 1 is a side elevation view of a bridge showing the first and second bridge portions each having an adjusting knob and further showing the second bridge portion rotationally supporting a swivel nut.
Figure 2:
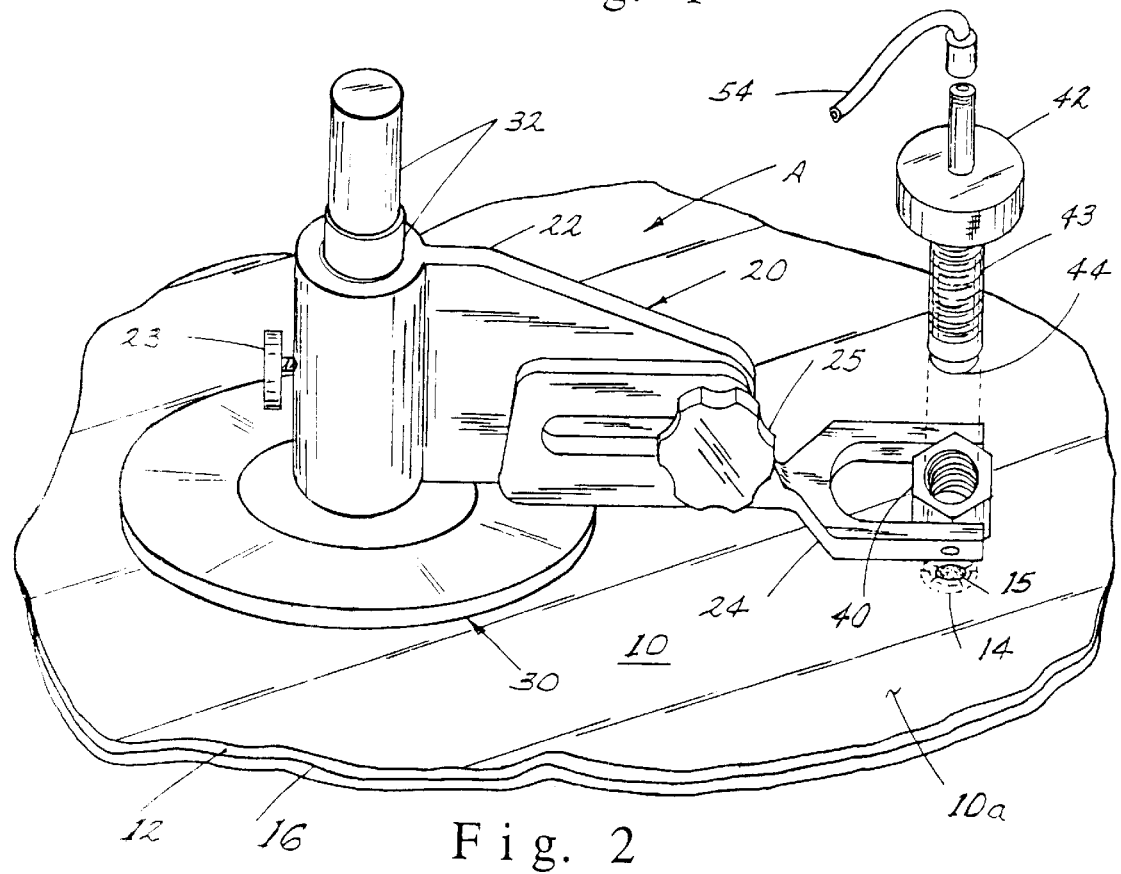
FIG. 2 is a perspective view of a repair assembly attached to a laminated glass with the swivel nut place over a drilled hole provided in the glass, and the injector and hose are in a position to be attached to the repair assembly for repairing a layer area having been damaged.
Figure 3:
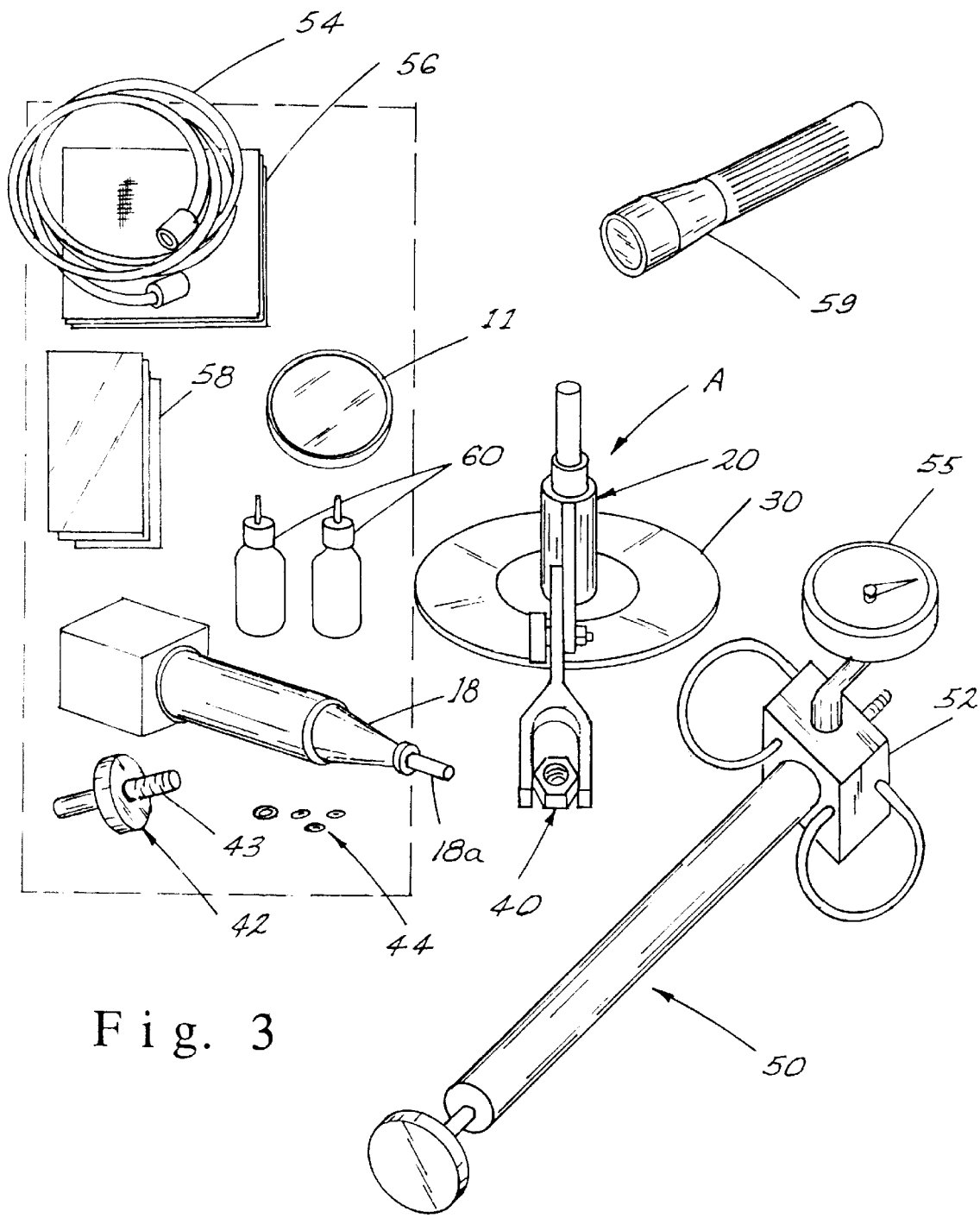
FIG. 3 is a combination of system components each in a perspective view showing the system of components used in combination during the process of repairing the laminated glass.
Figure 4A:
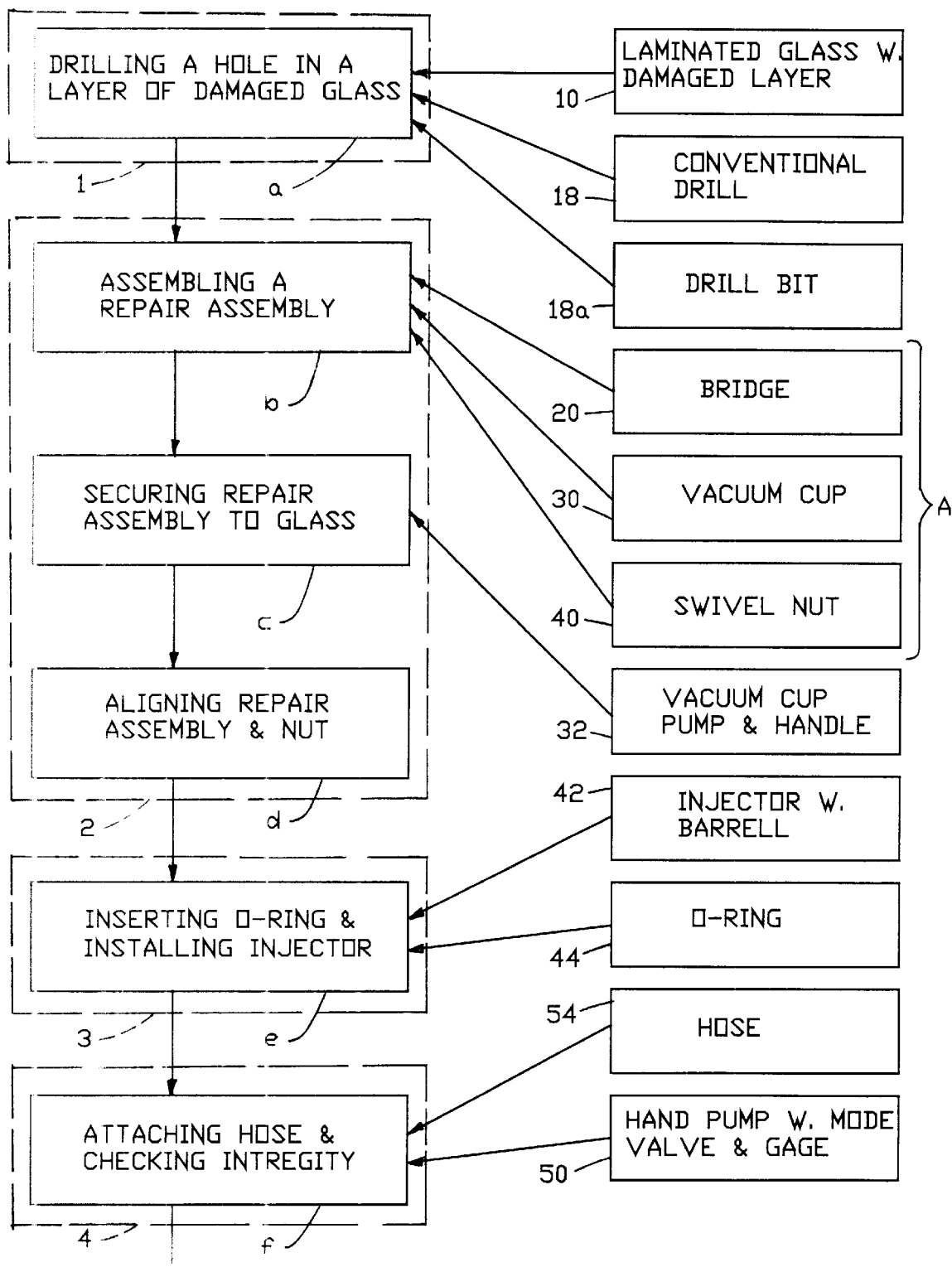
FIG. 4A is a flow diagram illustrating the method steps for assembling the essential system of components to be aligned, installed and attached together to initiate the repair of the damaged area of the glass.
Figure 4B:
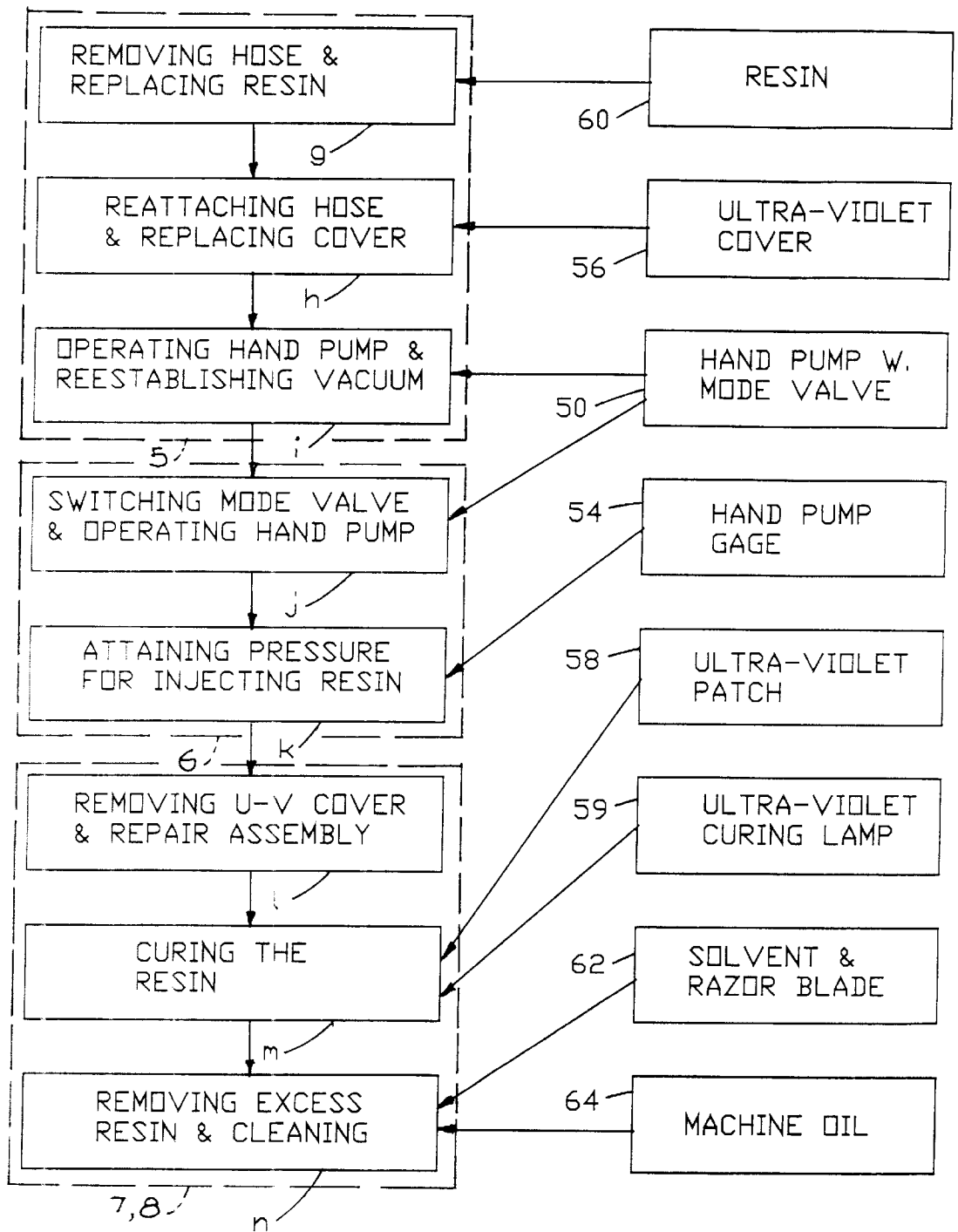
FIG. 4B is a flow diagram illustrating the method steps for assembling the essential system of components to provide for the evacuation of air, injection of resin and curing of the resin to complete the repair of the damaged area of the glass.

Referring now in more detail to the drawings, the invention will now be described in more detail. FIGS. 1–3 show the system of components and how they are used in the process of repairing a laminated glass 10 having a first layer 12 which has been damaged. FIGS. 4A and 4B are flow diagrams showing steps "a" through "n" in the method for repairing the glass and the associated components necessary to achieve each step in the repair process. There are eight basic operations or different tasks that include the steps defined in this invention. The eight basic operations are identified by the boxes formed by dashed lines in FIGS. 4A and 4B. The first four operations 1–4 of FIG. 4A define what tasks are involved prior to injecting a resin in the damaged area of the glass. The second four operations 5–8 of FIG. 4B define what tasks are involved with using the resin in the damaged area of the glass to realize the improved repair of this invention.

A common application of the present invention is in repairing laminated glass windshields of vehicles. In general, any laminated glass having a localized layer area that has been damaged can be repaired by the method of the present invention.

On most windshield repairs, drilling a hole 15 is require to extend through the first layer 12 of a laminated glass 10 directly into the center of the damaged area 14, as illustrated in FIG. 2. This is to give a resin used in the repair an unrestricted path into the break. However, not all breaks will require drilling. When drilling, one should not drill into the lamination 16 between glass layers. Drill through the first (damaged) layer of glass only. Gently blow dust from the break. Cleaners should not be used as this will only enter the damaged area and could prevent a successful repair. A mirror 11 is provided (FIG. 3) for attachment to the inside of the windshield and, when positioned under the break, one can observe the repair process.

A next step is to assemble a repair assembly A having a bridge 20, a vacuum cup 30 and a swivel nut 40 as illustrated in FIG. 2. Assemble bridge 20 to cup 30 by making a set screw 23a snug using a first knob 23. One should not over-tighten the set screw as it could damage the vacuum cup 30. Align the swivel nut 40 over the break, so the drilled hole 15 is near the center of the swivel nut while operating a vacuum cup pump for securing the repair assembly A to the windshield or glass 10. Aligning the swivel nut over the drilled hole 15 is realized using adjusting knobs 23 and 25. After centered the swivel nut over the drilled hole, tighten all adjusting knobs. The vacuum cup and the bridge must be secured so that they are stationary and do not move with respect to the glass. Swivel nut 40 lays against the glass. The repair assembly A is uniquely adjustable to conform to a glass having a small radius of curvature (i.e. the lateral edges of a windshield).

The vacuum cup is preferably a conventional vacuum cup used for handling large glass sections. The vacuum cup includes a handle with a pump integral with the handle. The vacuum cup is placed on the glass and the pump in the handle is operated to secure the vacuum cup to the glass. The bridge can be placed over the handle after the vacuum cup has been secured to the glass. This offers a degree of freedom in installing and using the system of components not available in prior art devices.

The next step is inserting an o-ring 44 into a base of an injector barrel 43 of an injector 42. These system components are illustrated in FIG. 3 for assembly as noted in FIGS. 4A and 4B. The preferred injector is made of brass. Installing the injector is realized by screwing the injector into the swivel nut 40 positioned over the drilled hole to be repaired. Once again, one needs to be sure the drilled hole is centered with respect to the injector barrel of the injector. Readjust the bridge if necessary by adjusting the adjustable portions 22 and 24 of the bridge 20 relative to one another using the adjusting knobs 23 and 25 (FIG. 2). The injector barrel is screwed down until it touches the glass. Approximately two more revolutions of the injector are made until the o-ring 44 is seated snugly on glass 10. One should not over-tighten the injector barrel to the glass as this could cause the glass to crack further. A unique feature of this invention is that the repair assembly has a large vacuum cup combined with relatively short bridge portions of the bridge which allows the operator to achieve a good seal between the o-ring and the glass. A good seal allows relatively high pressures to be maintained in the injector barrel during the repair process.

Checking the integrity of the system to see if you have a good seal between the glass and o-ring is realized by attaching one end of a hose 54 to the installed injector 42 and the other end to a hand pump 50 and creating a vacuum. This is desirable before placing resin into injector. If the vacuum pressure remains generally constant and does not drop, you have a good seal, indicating that the damaged area can be repaired. Obtaining a good seal will take some practice. If the outer surface of the glass is damaged and chipped larger than injector barrel diameter, a positive seal is not possible. This verification step is unique to the method of this invention. In this case, a repair can not be completed properly. However, a small amount of vacuum loss is expected and one can compensate for a small loss by occasionally pumping to the desired pressure. Pressures are measured with respect to atmospheric pressure being zero and a negative pressure is referred to herein as a vacuum pressure. Units of pounds per square inch are used herein for pressure, commonly and incorrectly referred to in the industry as simply pounds.

The next step involves carefully removing the hose 54 from injector 42. From two to three drops of a resin 60 are then placed into the injector. Larger repairs naturally require more resin to fill the hole. After reattaching the hose to the injector, covering it from sunlight with an ultra-violet (U-V) cover 56 is necessary to keep the resin from curing too quickly in the injector. With the hand pump operating in a vacuum mode, a vacuum is reestablished to provide a vacuuming cycle. The hand pump is equipped with a mode valve 52. These various system components used in the process are illustrated in FIG. 3. A vacuum pressure between 15 to 25 pounds per square inch is sufficient for removing air from the drilled hole of the damaged area of the glass. During this step, bubbles may appear rising up through the resin in the injector barrel. This is the air that was trapped in the damaged area. The vacuum cycle is continued for five minutes, occasionally checking a hand pump gauge 55 of the hand pump 50 to be sure enough vacuum pressure is obtained (FIG. 3). Occasionally a vacuum pressure loss will occur which can be compensated by pumping the hand pump to obtain a desire vacuum pressure.

After vacuum cycle is completed, switching the pump to a pressure cycle or mode is required by switching the mode valve 52 to provide a pressurizing cycle. A pressure is attained for injecting the resin into the hole to repair the glass, being careful not to over-pressurize the damage area while making the repair. Looking in the mirror 11 placed on the inside of the glass, one can see resin flowing into damaged area. After attaining the proper amount of pressure, maintain the pressure for fifteen minutes, occasionally checking the pressure and compensating, if necessary. A small amount of pressure loss is expected and one can compensate for a small loss by occasionally pumping up the injector to the desired pressure. Too much pressure can damage the glass and break it further. The recommended and preferred pressure should not be more than 30 to 35 pounds per square inch (psi). Although some repairs may require more than 30 to 35 psi, one should be aware that any repair could crack further from the repair attempt.

The ability to achieve relatively high pressures in the pressure cycle is a result of the unique design of the present invention. The relative size of the vacuum cup 30 and the short rigid bridge portions 22 and 24 help maintain a seal at the interface of the injector 43 with the o-ring 44 to glass surface 10*a* (FIG. 2); when the injector is screwed into the swivel nut 40. Once again, adjusting knobs 23 and 25 allow the swivel nut to be positioned properly at the drilled hole 15 formed in the layer 12 of the glass 10 at the damage area.

Small amounts of debris may be in cracks. This can keep resin from flowing out through entire break area. One can help the flow of resin by applying a small amount of pressure with a finger of the hand or a pick directly under crack to help open the crack some. Care should be exercised not to put too much force on crack as this could cause it to extend further. One can also open the crack by applying heat under break by using a lighter or small torch. However, too much heat can cause further damage. This pressure cycle should be left in place for ten minutes to allow flow of resin. The preferred pressure cycle time is fifteen minutes, as previously stated.

With the repair assembly A still attached to a windshield or glass, the U-V cover is removed. This step initiates the curing process, as the exposure of the resin to U-V light causes the resin to cure. After exposing the repaired area to sunlight for two minutes the repair assembly is removed. If sunlight is not available a U-V curing lamp 59 (FIG. 3) is used. The U-V lamp is held over the repaired glass until cured. Curing can be accelerated by applying a plastic U-V patch 58 (FIG. 3). Letting the patch set, the resin is usually cured in five minutes. Remove the patch and with a sharp razor blade, scrape excess resin off the windshield or glass surface; being careful not to scrape resin out of the drilled hole having been filled with resin.

Cleaning the injector barrel 43 and swivel nut 40 is accomplished with alcohol. Apply a light machine oil to the injector and the swivel nut to keep them from corrosion.

While a preferred embodiment of the invention has been described using specific terms, such description is for illustrative purposes only, and it is to be understood that changes and variations may be made without departing from the spirit or scope of the following claims.

What is claimed is:

1. A system for repairing curved and flat laminated glass having a layer area which has been damaged, said system comprises:

a repair assembly including a single vacuum cup mechanism for anchoring said assembly to the glass near a hole drilled in a damaged layer of said laminated glass;

an adjustable bridge rotatably carried by said vacuum cup mechanism for rotation about an axis of said vacuum cup mechanism so that turning a first adjusting knob fixes the rotational position of the bridge with respect to the vacuum cup;

said vacuum cup mechanism having a pump and handle combination for securing said repair assembly to a surface of said glass so that said bridge is adjustable with respect to the vacuum cup and glass;

said adjustable bridge including first and second bridge portions which are adjustable with respect to one another using a second adjusting knob to radially position an outer end of the bridge from said vacuum cup;

an injector held in position over said damage area by a swivel nut rotatably attached to said outer end of said adjustable bridge;

said injector having an injector barrel to receive an o-ring so that said o-ring contacts said surface of said glass to encircle said drilled hole so that said injector can be pressurized; and a hand pump connected to said injector and having a mode valve so that said hand pump can be operated in a vacuuming mode as well as a pressurizing mode to force a resin into said damaged area through said injector, wherein repairs are made by accessing only the damaged side of the laminated glass.

2. The system of claim 1 further comprising:

a drill and drill bit for drilling through said layer area to form said drilled hole in a location coexisting with the glass layer area to generally remove at least a portion of the damaged glass;

a hose having one end connected to the injector and the other end connected to a hand pump;

said hose being removable from said injector so that a resin can be inserted in said injector barrel for injecting said resin into said drilled hole when said hand pump is placed in said pressurizing mode by said mode valve and operated;

a hand pump gauge of said hand pump for helping to attain an injection pressure to force said resin into said drilled hole;

an ultra-violet cover placed over said injector for delaying the curing of said resin so that said resin can be forced into said drilled hole before it cures; and an ultra-violet patch to place over said resin after said resin is injected in said drilled hole for helping to cure the resin, wherein conventional tools and solvents are used for removing excess resin to essentially complete said repair of said glass.

3. The system of claim 2 wherein said bridge includes:

a first bridge portion having a first one of said adjusting knobs for affixing said bridge in an angular position with respect to said vacuum cup to extend in the general direction of said drilled hole; and a second bridge portion having a second one of said adjusting knobs for affixing said second bridge portion in an extended and rotated position from said first bridge portion so that said swivel nut is properly located and said o-ring has said contact with said glass.

4. The system of claim 1 wherein said injection pressure is not more than 30 to 35 pounds per square inch.

5. The system of claim 4 wherein said injection pressure is maintained by said hand pump for a pressure cycle time period of 10 to 15 minutes, until injection into said drilled hole is essentially complete.

6. The system of claim 1 including an ultra-violet curing lamp having an light source for holding over said resin to assist in curing said resin.

7. The system of claim 1 wherein said mode valve is positioned for operating said hand pump in said vacuuming mode at a vacuum pressure between 15 to 25 pounds per square inch so that air can be evacuated from the drilled hole and said injector barrel before said resin is injected into said drilled hole.

8. The system of claim 7 wherein said hand pump maintains said vacuum pressure for a vacuum cycle time period of five minutes.

* * * * *